United States Patent
Muzzin et al.

(10) Patent No.: US 7,511,864 B2
(45) Date of Patent: Mar. 31, 2009

(54) IMAGE SCANNING APPARATUS THAT SCANS BOTH SIDES OF AN INPUT SHEET

(75) Inventors: Mark Muzzin, Brampton (CA); Ned N. Ivanovich, Brampton (CA); Petrus T. Dekoning, Toronto (CA); John F. Lombardo, Woodbridge (CA)

(73) Assignee: Xerox Corporation, Norwalk, CT (US)

( * ) Notice: Subject to any disclaimer, the term of this patent is extended or adjusted under 35 U.S.C. 154(b) by 906 days.

(21) Appl. No.: 10/847,407

(22) Filed: May 17, 2004

(65) Prior Publication Data
US 2005/0254105 A1      Nov. 17, 2005

(51) Int. Cl.
*H04N 1/04*      (2006.01)
*H04N 1/46*      (2006.01)

(52) U.S. Cl. .......... 358/496; 358/505; 358/498; 358/486; 358/474

(58) Field of Classification Search .......... 358/1.1, 358/1.14, 1.15, 1.2, 474, 505, 509, 496, 475, 358/449, 425, 495, 401, 443, 406, 483, 470, 358/296, 497, 498, 486; 399/77, 79, 364, 399/365, 376; 355/23, 24, 26, 75; 271/3.02, 271/125, 301; 370/376; 707/100; 412/11
See application file for complete search history.

(56) References Cited

U.S. PATENT DOCUMENTS

| | | | | |
|---|---|---|---|---|
| 3,856,295 A * | 12/1974 | Looney | ........... | 355/24 |
| 4,125,325 A * | 11/1978 | Batchelor et al. | ........... | 355/26 |
| 4,130,354 A * | 12/1978 | Steiner | ........... | 355/26 |
| 4,264,187 A * | 4/1981 | Rhodes, Jr | ........... | 355/23 |
| 4,278,344 A * | 7/1981 | Sahay | ........... | 355/23 |
| 4,391,504 A * | 7/1983 | Acquaviva | ........... | 399/139 |
| 4,456,236 A * | 6/1984 | Buddendeck | ........... | 355/24 |
| 4,457,506 A * | 7/1984 | Ashbee et al. | ........... | 355/23 |

(Continued)

FOREIGN PATENT DOCUMENTS

JP      11-177778A HEI      7/1999

(Continued)

OTHER PUBLICATIONS

"Automatic Duplex Document Electronic Scanning" by Richard E. Smith, and published in the Xerox Disclosure Journal, vol. 8, No. 3, May/Jun. 1983 at p. 263.

(Continued)

*Primary Examiner*—Twyler L Haskins
*Assistant Examiner*—Jonathan R Beckley
(74) *Attorney, Agent, or Firm*—R. Hutter

(57) ABSTRACT

A document handler, such as used in a digital copier, includes an input tray and an output tray, connected by a paper path. Along the paper path are disposed two scan heads, one to record image data from each side of the sheet. The two scan heads are separated from each other along the paper path by a pitch length longer than a sheet to be scanned. The arrangement allows an image on each side of the sheet to be scanned at an exclusive time. For long sheets, a recirculation path, associated with the paper path, is used to allow the sheet to re-enter the paper path: in this way, one side of the sheet is scanned with one scan head, and then the other side is scanned with the other scan head.

6 Claims, 3 Drawing Sheets

U.S. PATENT DOCUMENTS

| | | | | |
|---|---|---|---|---|
| 4,536,077 A * | 8/1985 | Stoffel | | 358/497 |
| 4,557,474 A * | 12/1985 | Davis et al. | | 271/301 |
| 4,727,401 A * | 2/1988 | Partilla et al. | | 355/24 |
| 4,743,974 A * | 5/1988 | Lockwood | | 358/296 |
| 4,884,097 A * | 11/1989 | Giannetti et al. | | 355/23 |
| 4,901,117 A * | 2/1990 | Derrick | | 355/24 |
| 4,903,139 A * | 2/1990 | Minter | | 358/470 |
| 4,949,189 A * | 8/1990 | Ohmori | | 358/482 |
| 4,974,034 A * | 11/1990 | Rabb et al. | | 399/364 |
| 5,270,838 A * | 12/1993 | Mita | | 358/406 |
| 5,301,036 A * | 4/1994 | Barrett et al. | | 358/443 |
| 5,339,139 A * | 8/1994 | Fullerton et al. | | 355/75 |
| 5,383,754 A * | 1/1995 | Sumida et al. | | 412/11 |
| 5,418,607 A * | 5/1995 | Tani | | 355/26 |
| 5,430,536 A * | 7/1995 | Fullerton et al. | | 399/364 |
| 5,438,435 A * | 8/1995 | Lawniczak | | 358/401 |
| 5,463,451 A * | 10/1995 | Acquaviva et al. | | 358/495 |
| 5,467,182 A * | 11/1995 | Hower et al. | | 355/24 |
| 5,565,964 A * | 10/1996 | Tashiro et al. | | 358/425 |
| 5,600,429 A * | 2/1997 | Kutsuwada | | 358/449 |
| 5,604,577 A * | 2/1997 | Wakuda et al. | | 399/364 |
| 5,669,056 A * | 9/1997 | Rubscha | | 399/367 |
| 5,678,135 A * | 10/1997 | Fukui et al. | | 399/77 |
| 5,680,204 A * | 10/1997 | Ferrara | | 399/364 |
| 5,687,010 A * | 11/1997 | Van Tilborg et al. | | 358/496 |
| 5,689,792 A * | 11/1997 | Acquaviva et al. | | 399/365 |
| 5,789,729 A * | 8/1998 | Yamamoto | | 355/23 |
| 5,854,693 A * | 12/1998 | Yoshiura et al. | | 358/1.15 |
| 6,151,464 A * | 11/2000 | Nakamura et al. | | 399/79 |
| 6,169,873 B1 * | 1/2001 | Connolly | | 399/365 |
| 6,209,861 B1 * | 4/2001 | Kakuta et al. | | 271/3.02 |
| 6,233,063 B1 * | 5/2001 | Bernasconi et al. | | 358/475 |
| 6,266,512 B1 * | 7/2001 | de Koning et al. | | 399/376 |
| 6,434,359 B2 * | 8/2002 | Nose et al. | | 399/374 |
| 6,641,132 B2 * | 11/2003 | Sekine | | 271/125 |
| 6,721,074 B1 * | 4/2004 | Kao | | 358/496 |
| 6,785,024 B1 * | 8/2004 | Corby et al. | | 358/474 |
| 7,013,305 B2 * | 3/2006 | Elko et al. | | 707/100 |
| 7,142,335 B2 * | 11/2006 | Tesavis | | 358/505 |
| 7,164,507 B2 * | 1/2007 | Beck et al. | | 358/474 |
| 7,257,091 B2 * | 8/2007 | Elko et al. | | 370/276 |
| 2004/0080791 A1 * | 4/2004 | Beck et al. | | 358/406 |
| 2004/0165233 A1 * | 8/2004 | Wang | | 358/509 |

FOREIGN PATENT DOCUMENTS

JP    2003-315936 A    11/2003

OTHER PUBLICATIONS

Collaterals for the Sharp® AR-M550/M620/M700, Pitney-Bowes® im3510 and im4510, and Fujitsu® M4097D.

* cited by examiner

IMAGE SCANNING APPARATUS THAT SCANS BOTH SIDES OF AN INPUT SHEET

TECHNICAL FIELD

The present disclosure relates to the scanning of original hard-copy images into electronic form, as would be found, for example, in a digital copier or other scanner.

BACKGROUND

Document handlers are devices which draw individual sheets from a stack of sheets, and sequentially allow the image on each sheet to be recorded, typically by a photoreceptor (in a "light-lens" or analog copier) or by a photosensitive device (in a digital copier, scanner, or facsimile). In a common arrangement, a copier has a conventional main platen, on which single sheets can be manually placed, as well as a smaller platen, typically adjacent the main platen, which is used by the document handler when sheets are being passed therethrough. In a typical design, when a single sheet is being recorded through the main platen, the photosensitive device (or "scan head") is moved relative to the platen to record the entire image; when the document handler is being used to expose images through the smaller platen, a photosensitive device is typically left stationary under the smaller platen, and the motion of the sheet caused by the hardware within the document handler provides the necessary relative motion of each sheet past the photosensitive device.

For recording images on sheets which bear images on both sides thereof, there has typically been two general approaches. For scanners with a single scan head, the general approach is to use the scan head first to scan one side of the sheet, and then mechanically invert and re-feed the sheet so that the other side of the sheet is moved past the scan head. For scanners with two scan heads, each scan head is effectively placed on opposite sides of a paper path, so that both images on both sides of the sheet are recorded.

In the two-scan-head case, a practical challenge relates to the fact that each of the two scan heads will in effect emit image data, possibly simultaneously, as a single sheet is being recorded. To accommodate this dual output of page image data, the downstream circuitry for processing and recording the image data must be designed accordingly. For various practical reasons, however, it is often preferable to retain a processing architecture (regarding both software and electronic hardware) which "handles" one page image at a time.

The present disclosure relates to a mechanical architecture for a two-scan-head document handler which takes into account the above-mentioned considerations.

PRIOR ART

"Automatic Duplex Document Electronic Scanning" by Richard E. Smith, and published in the Xerox Disclosure Journal, Vol. 8, No. 3, May/June, 1983 at page 263, discloses both side scanning of a document with two spaced apart scanning arrays arranged on opposite sides of a document path, and platen scanning by a movable carriage supporting one of the arrays.

U.S. Pat. No. 4,536,077 discloses an arrangement with an optical system directing light reflected from a first side of the document to a single scanning array while the document is moving past a first position, and subsequently directing light from the second side of the document to the scanning array when it has reached a second position. The arrangement includes a recirculating document handler, i.e., sheets to be scanned originate and end up in the same tray.

U.S. Pat. No. 5,430,536 discloses a document handler having one scan head. Duplex (two-side-image) sheets are sent through the document handler for scanning of one side, and then effectively inverted and re-fed past the scan head for scanning the other side.

US Published Patent Application 2004-0080791-A1, now U.S. Pat. No. 7,164,507, discloses a design of a document handler having two scan heads, one effectively disposed on either side of an inverting paper path.

Collaterals for the Sharp® AR-M550/M620/M700, Pitney-Bowes® im3510 and im4510, and Fujitsu® M4097D machines show current configurations of stand-alone and copier-based scanners.

SUMMARY

According to one aspect, an apparatus is provided for recording images on sheets, comprising an input tray and an output tray. A paper path is suitable for moving a sheet therethrough from the input tray to the output tray. A first scan head, disposed on a first side of the paper path, and a second scan head, disposed on a second side of the paper path, each output digital image data related to light reflected from an image moving therepast. The first scan head is spaced from the second scan head along the paper path by at least a first pitch length.

According to another aspect, an apparatus is provided for recording data from images on sheets, comprising an input tray and an output tray. A paper path is suitable for moving a sheet therethrough from the input tray to the output tray. A first scan head, disposed on a first side of the paper path, and a second scan head, disposed on a second side of the paper path, each output digital image data related to light reflected from an image moving therepast. A first recirculation path is associated with the paper path, whereby a sheet in the paper path can be moved past the first scan head and recirculated and moved past the second scan head.

DETAILED DESCRIPTION

Figure 1:
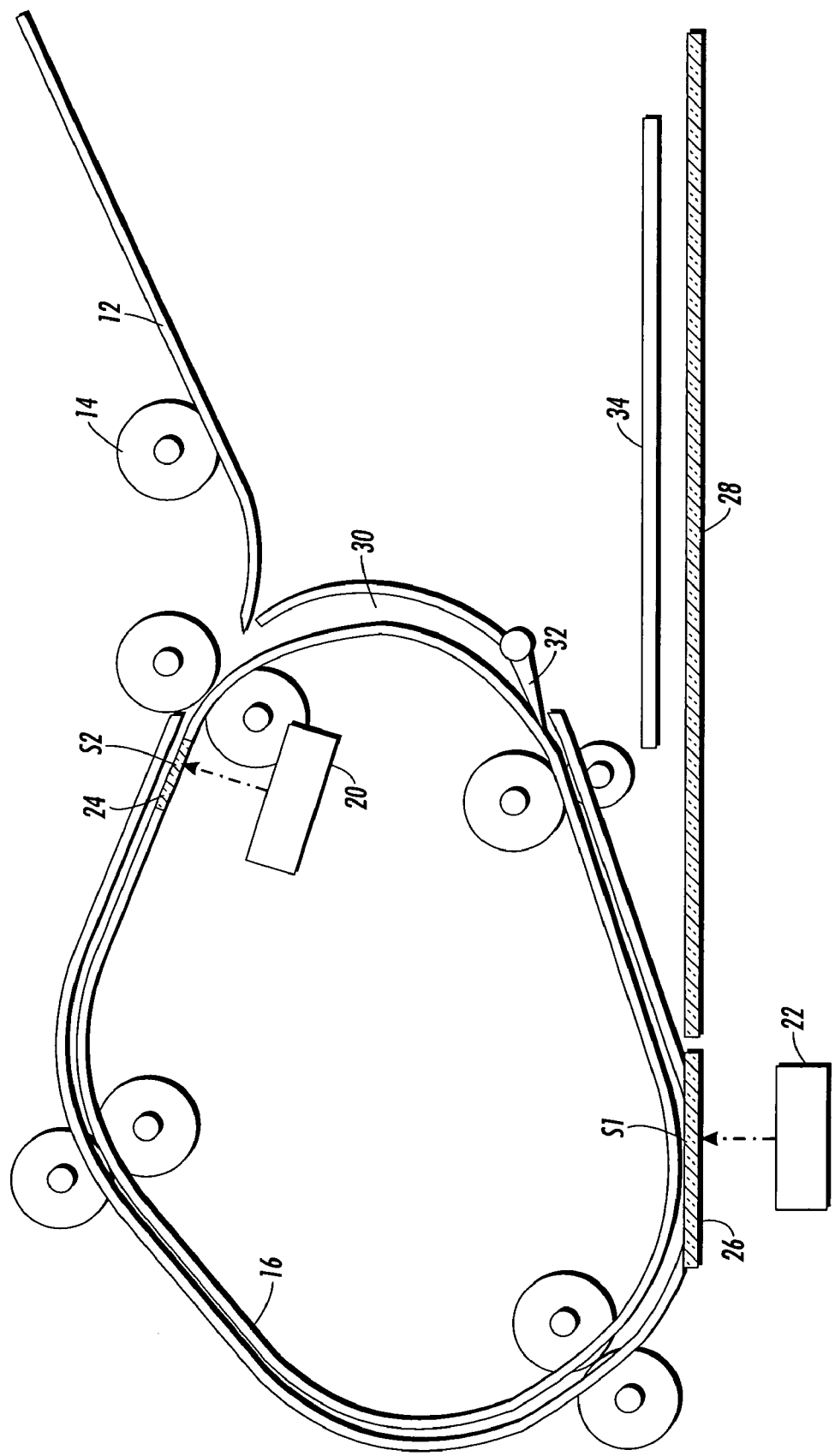
FIG. 1 is a simplified elevational view of one embodiment of a document handler for an input imaging scanner, such as used in a digital copier.

FIG. 1 is a simplified elevational view of the architecture of one embodiment of a document handler for an input imaging scanner, such as used in a digital copier. A stack of image-bearing sheets is placed in an input tray 12. The sheets in the stack are drawn, one at a time, from the stack by a pickoff roller 14 (or equivalent structure of general familiarity in the art, which may include, for example, a vacuum head). In this embodiment, sheets are drawn from the stack by pickoff roller 14 from the top sheet downward, so the sheets should be placed "first-page-up" in the input tray 12. The individual sheets are caused to pass at a constant velocity through paper path 16. Paper path 16 may include any number of baffles and rollers to achieve the desired paper motion: depending on a particular practical embodiment, various rollers may be actively driven (by one or more motors, not shown) or permitted to roll freely. As shown in FIG. 1, paper path 16 effectively inverts (i.e., turns over) a sheet passing therethrough, by virtue of its U-shape. Sheets which originate in input tray 12 and pass through paper path 16 eventually end up in output tray 34.

At certain locations along the paper path 16 are disposed what can be generally called "scan heads" 20 and 22. For present purposes, a "scan head" is a photosensitive device outputting digital image data related to light reflected from an image moving therepast. As such, a scan head typically comprises one or more linear arrays of photosensors, along with associated circuitry to read out resulting image signals in an organized manner. The photosensors are typically of the CCD or CMOS variety generally familiar in the art; as shown in the Figure, the arrays associated with each scan head 20, 22 extend across the full width of the paper path 16, but either or both scan heads can include a relatively short array which reads the images on the sheets in the paper path 16 through a reductive optics, as is generally familiar in the art.

The scan heads 20, 22 each view a sheet moving therepast through a window, shown respectively as 24, 26. Each scan head will also have associated therewith a light source, not shown. As can be seen from the Figure, the scan heads are configured so that, if the stack of originals are placed first-side-up in tray 12, scan head 20 will view the second side of each sheet, and then scan head 22 will view the first side of each sheet. The effective locations of scan heads 20, 22, where each scan head views a small "slice" of an image on a sheet moving therepast, are indicated as scan locations S1 and S2.

In the embodiment, scan locations S1 and S2 are separated along the paper path 16 by at least a "pitch length." A pitch length is defined as a length of a sheet of predetermined size along the direction of motion through the paper path, plus an interdocument length. For instance, if the illustrated document handler is "long-edge-feed," the effective length of a letter-size sheet is 8.5 inches, and slightly less for an A4 sheet; in such a case, a useful pitch length would be nine inches, to accommodate both sizes of sheet. The pitch length is useful to establish a "rhythm" for the associated hardware and software to accept and process data corresponding to successive page images.

By providing scan locations which are separated by a pitch length, for each single sheet (having images on both sides thereof) being scanned, one scan head such as 20 will be finished recording its image before the other scan head 22 will begin scanning its image. However, the arrangement in FIG. 1 is useful even if the downstream image-processing circuitry is capable of handling two page images simultaneously. In this way, the FIG. 1 document handler is a useful hardware architecture for different designs of image-processing hardware and software.

If the document handler of FIG. 1 is used for larger sheets than are taken into account in the pitch length (herein called "long sheets"), such as legal-size sheets fed short-edge-in, the above condition of the two scan heads operating at exclusive, non-overlapping times will not apply: for instance, a lead edge of the long sheet will arrive at scan location S1 before the trail edge clears scan location S2. In such a case, the long sheets can be re-circulated through the paper path 16 via a "recirculation path" 30. A sheet moving through paper path 16 can be diverted by the action of a diverter gate 32 back into the front end of paper path 16 (otherwise, as in the normal case, the diverter gate 32 can be used to direct a scanned sheet to output tray 34). When a sheet is thus re-circulated, each side of the sheet can be exposed to one or the other scan head 20, 22 with each of two circulations through the paper path. In this way, the objective of having exclusive scanning of each side can be preserved, even with a long sheet.

As can be seen in FIG. 1, the input tray 12 is disposed substantially above the output tray 34, and the paper path 16 and the recirculation path 30 are disposed substantially to one side of the input tray and output tray. The lower window 26 can be coplanar, or integral, with a main platen 28, which is used to scan manually-placed originals, as is familiar in the art: when the main platen 28 is used, the scan head 22 is caused to move relative to the main platen 28.

Figure 2:
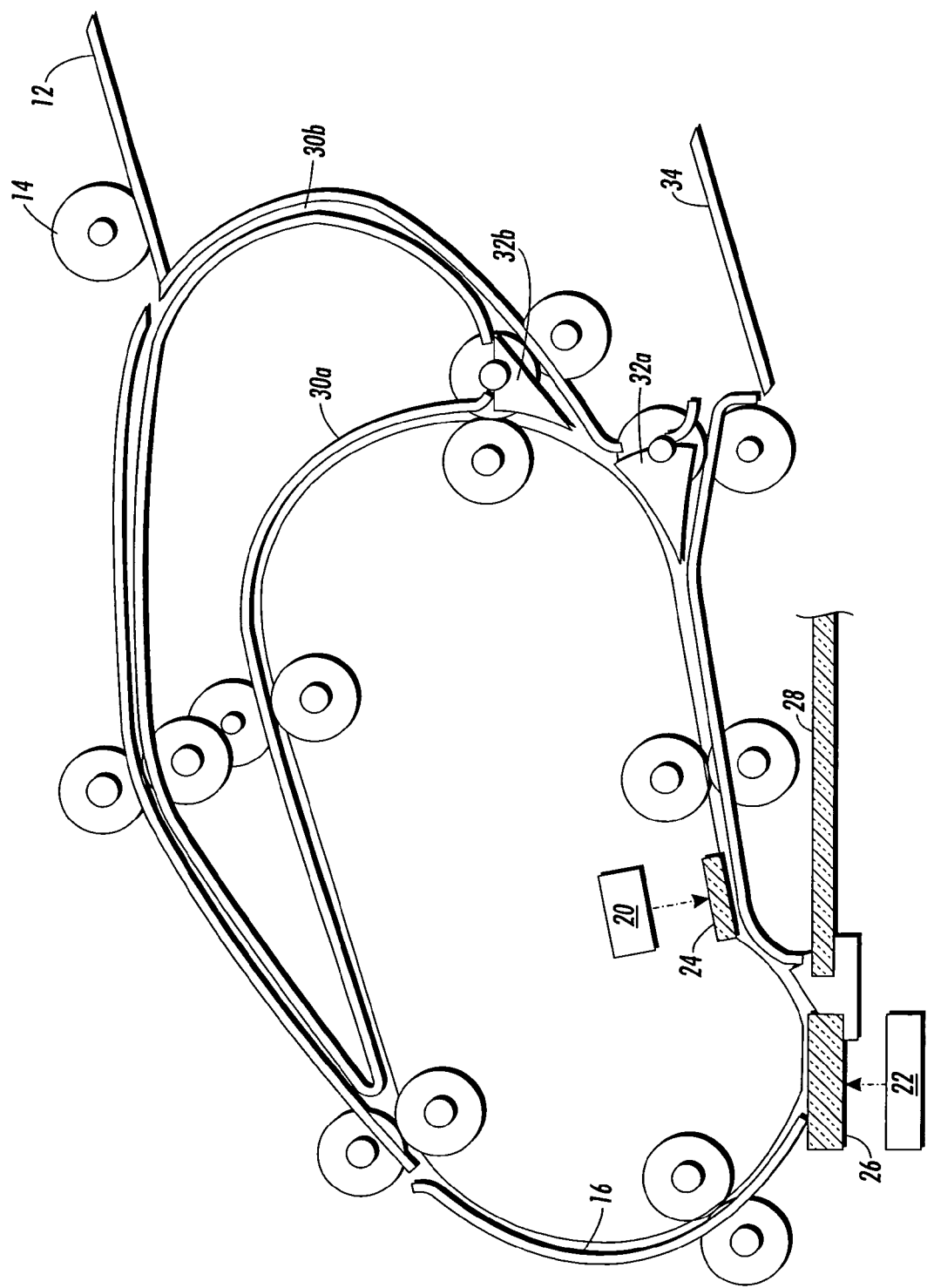
FIG. 2 is a simplified elevational view of another embodiment of a document handler for an input imaging scanner, such as used in a digital copier.

FIG. 2 is a simplified elevational view of another embodiment of a document handler for an input imaging scanner, such as used in a digital copier. In the FIG. 1 and FIG. 2 embodiments, like reference numbers indicate like elements. The FIG. 2 embodiment differs from the FIG. 1 embodiment in that, first, the scan head 20 is disposed relatively close to scan head 22; and, second, there is provided a first recirculation path 30a, and a second, longer, recirculation path 30b. A sheet moving through paper path 16 is sent through either recirculation path as needed, or sent to output tray 34, by operation of a first diverter gate 32a and second diverter gate 32b. As with the FIG. 1 embodiment, the input tray 12 is disposed substantially above the output tray 34, and the paper path 16 and the recirculation paths 30a, 30b are disposed substantially to one side of the input tray and output tray.

Because, in the FIG. 2 embodiment, the scan heads 20, 22 are not inherently spaced by more than a pitch length, in order to scan each side of a single sheet in a manner where there is no time overlap between the scanning of each side, one of the recirculation paths 30a or 30b is used to run a sheet through the paper path 16 twice, so that each scan head 20, 22 has an exclusive opportunity to record data from a side of the sheet. Thus, for a short sheet, one side of the sheet is scanned by the appropriate scan head 20 or 22; and then the sheet is fed (by operation of the diverter gate 32a) through recirculation path 30a, and back into paper path 16, for scanning by the other scan head. After both sides are scanned, the diverter gate 32a is used to direct the sheet to output tray 34.

For the relatively short sheet, the total length of paper path 16 and recirculation path 30a is such that an entire sheet can be scanned by one scan head, such as 20, before the lead edge of the sheet arrives at scan head 22. In this way, each scan head 20, 22 has an exclusive (in time) opportunity to record data from a side of the sheet. For a long sheet, meaning in this case a sheet of a length longer than the total length of paper path 16 and recirculation path 30a, a longer recirculation path, 30b, is used; the longer path can accommodate a longer sheet. The various driven rollers and diverter gates as shown in FIG. 2 can be controlled (by a control means, not shown, but the nature of which would be generally apparent to one of skill in the art) to carry out the necessary motion of a sheet for a successful two-sided scan of a sheet.

In operating a document handler as in FIG. 1 or FIG. 2, it may be necessary for the control system to have data relating to whether the sheet being scanned at any time is a short sheet or a long sheet. Such data could be entered into the control system through a user interface, or through the outputs of page size sensors (not shown) associated with the input tray 12.

When drawing off image data from each of the scan heads 20, 22, where the image data is output one page image (side) at a time, if the documents are stacked first-side-up in input tray 12 in FIG. 1, the data associated with the second side of each sheet will be output from scan head 20 before the data associated with the first side is output from scan head 22. This arrangement can be taken into account when accumulating page image data in downstream memory, by temporarily caching the second-side image data from scan head 20 until the first-side image data from scan head 22 is collected. In this way, the page order of data for a multi-page document can be preserved.

Figure 3:
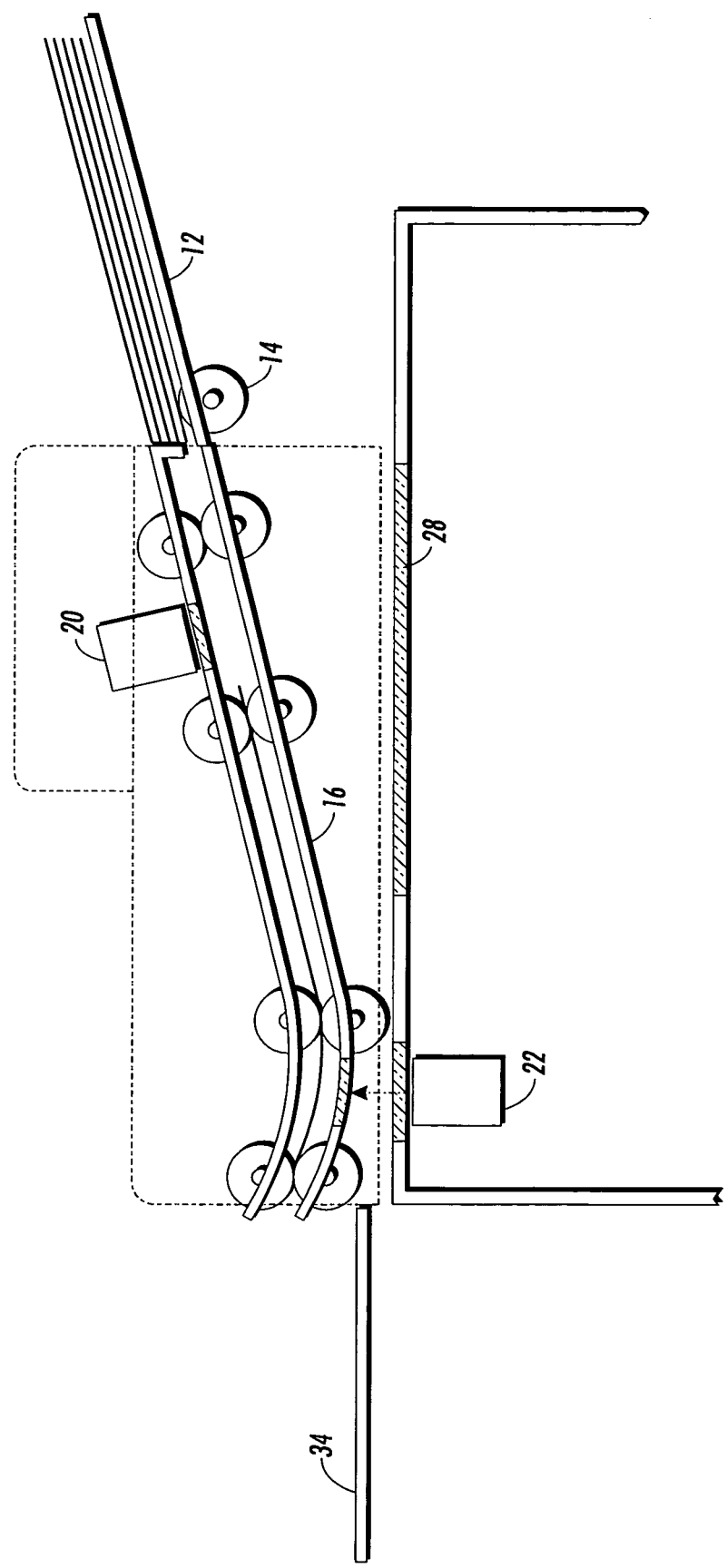
FIG. 3 is a simplified elevational view of another embodiment of a document handler for an input imaging scanner, such as used in a digital copier.

FIG. 3 is a simplified elevational view of another embodiment of a document handler for an input imaging scanner, such as used in a digital copier. In this embodiment, where like reference numerals refer to equivalent elements as in the above-described embodiments, input tray 12 and output tray 34 are configured at ends of a substantially straight paper path 16. Scan heads 22 and 24 are disposed along paper path 16 and are spaced by at least a pitch length, as shown. Also as shown, the pickoff roller 14 can be placed to draw sheets from the bottom of the stack in input tray 12, such as in a "face-down" arrangement.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An apparatus for recording data from images on sheets, comprising:
    an input tray and an output tray;
    a paper path, suitable for moving a sheet therethrough from the input tray to the output tray;
    a first scan head, disposed on a first side of the paper path, and a second scan head, disposed on a second side of the paper path, the first scan head and second scan head each outputting digital image data related to light reflected from an image moving therepast;
    a first recirculation path associated with the paper path, whereby a sheet of a first size in the paper path can be moved past the first scan head and recirculated and moved past the second scan head, whereby the first scan head is finished recording an image before the second scan head begins scanning an image; and
    a second recirculation path associated with the paper path, whereby a sheet of a second size longer than the first size in the paper path can be moved past the first scan head and recirculated and moved past the second scan head, the second recirculation path being longer than the first recirculation path, whereby the first scan head is finished recording an image before the second scan head begins scanning an image.

2. The apparatus of claim 1, the paper path being shaped to invert a sheet passing therethrough.

3. The apparatus of claim 1, further comprising
    means for drawing a top sheet from a stack of sheets in the input tray to the paper path.

4. The apparatus of claim 1, the input tray being disposed substantially above the output tray, and the paper path and the first recirculation path being disposed substantially to one side of the input tray and output tray.

5. The apparatus of claim 1, the input tray being disposed substantially above the output tray, and the paper path and the first and second recirculation paths being disposed substantially to one side of the input tray and output tray.

6. The apparatus of claim 1, further comprising
    a diverter gate operable to direct a sheet in the paper path to one of the first recirculation path and second recirculation path.

* * * * *